(12) United States Patent
Tsao

(10) Patent No.: US 7,265,728 B1
(45) Date of Patent: Sep. 4, 2007

(54) METHOD FOR AUTOMATICALLY ADJUSTING ANTENNA AND SYSTEM THEREOF

(75) Inventor: Chung-Ming Tsao, Taipei (TW)

(73) Assignee: Inventec Multimedia & Telecom Corporation, Taipei (TW)

( * ) Notice: Subject to any disclaimer, the term of this patent is extended or adjusted under 35 U.S.C. 154(b) by 0 days.

(21) Appl. No.: 11/442,135

(22) Filed: May 30, 2006

(51) Int. Cl.
*H01Q 3/00* (2006.01)
(52) U.S. Cl. ............... 343/766; 455/151.1; 342/359
(58) Field of Classification Search ............ 343/757, 343/765, 766; 342/359; 318/601; 455/63.4, 455/151.1
See application file for complete search history.

(56) References Cited

U.S. PATENT DOCUMENTS

| | | | |
|---|---|---|---|
| 4,352,202 A * | 9/1982 | Carney | 455/151.4 |
| 5,227,806 A * | 7/1993 | Eguchi | 343/765 |
| 6,486,832 B1 * | 11/2002 | Abramov et al. | 343/700 MS |

FOREIGN PATENT DOCUMENTS

| | | |
|---|---|---|
| TW | 507944 | 10/2002 |
| TW | 200423588 | 1/2004 |
| TW | M245683 | 10/2004 |

* cited by examiner

Primary Examiner—Tan Ho
(74) Attorney, Agent, or Firm—Rabin & Berdo, P.C.

(57) ABSTRACT

A method for automatically adjusting an antenna and the system thereof are provided. The method includes driving the motor to rotate the antenna at first, so as to receive multiple first digital signals and record the position corresponding to the multiple first digital signals; comparing the multiple first digital signals to obtain the strongest first digital signal among them; driving the motor to rotate the antenna to the position corresponding to the strongest first digital signal; driving the motor to adjust the pitching angle of the antenna to receive multiple second digital signals and record the pitching angle corresponding to the multiple second digital signals; comparing the multiple second digital signals to obtain the strongest second digital signal among them; and driving the motor to rotate the antenna to the pitching angle corresponding to the strongest second digital signal.

10 Claims, 3 Drawing Sheets

METHOD FOR AUTOMATICALLY ADJUSTING ANTENNA AND SYSTEM THEREOF

BACKGROUND OF THE INVENTION

1. Field of Invention

The present invention relates to an antenna, and more particularly to a method for automatically adjusting an antenna and the system thereof, in which the antenna is adjusted according to the wireless signal strength of the received digital signals.

2. Related Art

As the wireless communication technology for transmitting signals can achieve the effect of communicating with remote devices without being connected through cables, it has the advantage of portability, thereby the species of the products adopting the wireless communication technology, such as a mobile phone, notebook, smart appliances with the wireless communication function, are increased gradually. The aforementioned devices transmit signals by wireless waves; therefore, the antenna for receiving wireless waves is an essential device for equipments with wireless communication.

For example, referring to FIG. 1, it is a schematic view of a computer 10 installed with a wireless network card 20 to connect to the wireless local area network (WLAN). The wireless network card 20 contains an antenna 5 mounted on the wireless network card 20. The wireless network card 20 is connected to the computer 10 through the PCMCIA slot, USB port and so on, wherein the antenna 5 is mounted on the wireless network card 20 in perpendicular to the surface of the wireless network card 20. In addition, the wireless network card 20 contains a transceiver 23, a signal sensor 24, and a controller 22. The transceiver 23 is electrically connected to the antenna 5 to transmit or receive wireless signals via the antenna 5. Then, the signal sensor 24 detects the signal strength of the wireless signals received by the antenna 5 to output a feedback signal to the controller 22, thereby the controller 22 changes the value of control current according to the signal strength detected by the signal sensor 24.

In short, when the signal detected by the signal sensor 24 is weak, the controller 22 increases the strength of the wireless signal by increasing the control current. The computer 10 can be quickly connected to the WLAN by the wireless network card 20. However, as the antenna 5 is fixed and unable to be adjusted on the wireless network card 20, the strength of the wireless signals transmitted and received by the wireless network card 20 can not be improved.

Moreover, in recent years, to prevent the strength of the signals from being weaken by the surrounding environment, various relative technologies and devices of adjusting the antenna angle are proposed to be used in other devices in need of receiving wireless wave signals, such as wireless TV, wireless communication devices, so as to maintain the strength of the wireless wave signals received. Furthermore, in the present method of obtaining the relative reference information of the signal strength, the received wireless wave signals directly go through the signal processing (for example, signal amplification, conversion and so on), so as to obtain the strength of the presently received signals as the reference for manual/automatic antenna adjustment.

In the conventional technology, one method relates to search wireless wave signals in multi-orientation in advance and then record various orientations of the searched wireless wave signals for being switched directly later if need be. In other words, the user can switch directly later, and the antenna can adjust the receivable angle according to the pre-recorded orientation, as shown in Taiwan Patent No. 507944. However, during moving, the orientation of the received wireless wave signals is bound to change continuously, so that the method can only be used for the fixed antennas, for example, the receiving antennas of wireless TV.

Furthermore, another method relates to employ an indicator to display the strength of the received wireless wave signals. When the indicator is used with an adjustable antenna, the user can manually adjust the receivable angle of the antenna to the preferable orientation referring to the signal strength displayed on the indicator, as shown in Taiwan Patents No. M245683 and No. 200423588.

In view of the above, the antenna angle plays an important role in the quality of the received wireless wave signals. However, the above-mentioned antenna is adjusted manually, and has the disadvantages that the process of adjusting signal is complicated and the precision of the antenna adjustment is low. Therefore, a method for automatically adjusting the direction of the antenna according to the strength of the received wireless wave signals is provided to overcome the defects of the conventional technology.

SUMMARY OF THE INVENTION

In view of the above, the object of the invention is to provide a method for automatically adjusting an antenna and the system thereof to solve the problems in the prior art.

To achieve the above object, the method for automatically adjusting an antenna in the invention employs a motor used for driving the antenna. The method includes driving the motor to rotate the antenna at first, so as to receive multiple first digital signals and record the position corresponding to the multiple first digital signals; comparing the multiple first digital signals to obtain the strongest first digital signal among them; driving the motor to rotate the antenna to the position corresponding to the strongest first digital signal; driving the motor to adjust the pitching angle of the antenna to receive multiple second digital signals and record the pitching angle corresponding to the multiple second digital signals; comparing the multiple second digital signals to obtain the strongest second digital signal among them; and driving the motor to rotate the antenna to the pitching angle corresponding to the strongest second digital signal.

Because the devices with antenna are not kept in a static state normally, they are set that after a certain time interval the motor is driven to adjust the position and pitching angle of the antenna again, so as to maintain the signal receiving quality and reduce the problem of signal weakening caused by the receiving environment.

Furthermore, the system for automatically adjusting an antenna of the present invention employs a motor used for rotating the antenna. The system includes a controller, a detector, a signal storage unit, and a comparator. The controller is used to drive the motor, so that the antenna receives multiple first digital signals when being rotated, and receives multiple second digital signals when the pitching angle of the antenna is adjusted. Meanwhile, the detector detects the positions corresponding to the multiple first digital signals when the antenna is rotated, and detects the positions corresponding to the multiple second digital signals when the pitching angle of the antenna is adjusted.

The signal storage unit is used to store the multiple first and second digital signals, the positions corresponding to the multiple first digital signals and the pitching angle corresponding to the multiple second digital signals. The comparator is used to compare the multiple first and second digital signals to obtain the strongest first and second digital signals among them, and send the strongest first and second digital signals back to the controller.

The controller is used to drive the motor according to the signal storage unit, so as to rotate the antenna to the position corresponding to the strongest first digital signal and the pitching angle corresponding to the strongest second digital signal.

Because the receiving devices with antenna are normally not kept in a static state, the controller contains a timer. The timer starts timing at a predetermined time, and when a set time is reached, the controller drives the motor again, so that the antenna can be to be positioned at the preferable receiving orientation regardless of its location.

The detailed features and advantages will be illustrated in detail in the following embodiments, and the technology in the invention is apparent to people skilled in the art according to the content of the invention, and those skilled in the art can implement it accordingly. Moreover, the relative objects and advantages of the invention are apparent to those skilled in the art according to the disclosure, claims and drawings of the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
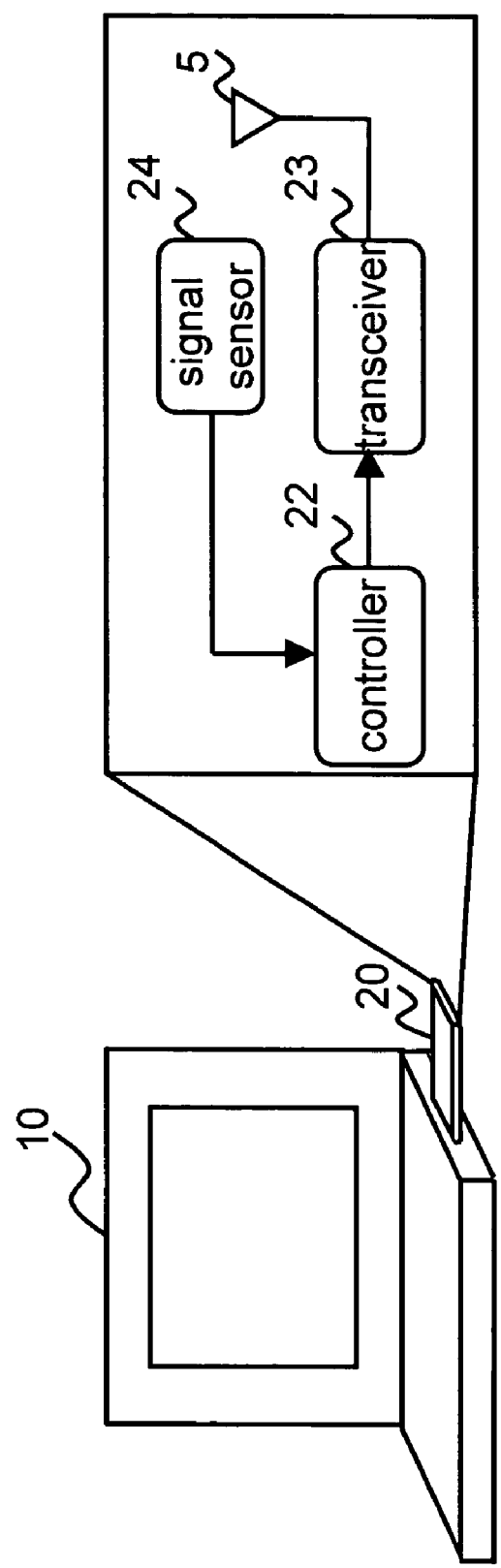
FIG. 1 is a schematic view of the conventional way of connecting a computer to the wireless local area network by a wireless network card.

Due to the developing of the wireless communication, the wireless products are widely used. Since the digital broadcasting becomes popular, people can easily watch digital TV programs by a portable TV or other devices. However, to maintain the strength of the wireless wave signals, conventionally the received wireless wave signals directly go through the signal processing (for example, signal amplification, conversion and so on) to obtain the strength of the signals received at present as the reference for the manual antenna adjustment. However, in this invention, the strength of the received signals is not enhanced, but the motor is driven to rotate the antenna to the orientation of the strongest signal in the received multiple signals according to the auto-adjusting mechanism.

The content of the invention is illustrated in detail with reference to the embodiments and the accompanying drawings. The symbols mentioned in the invention refer to those in the drawings.

First, the method and system of the invention can be applied in various receivers containing a motor and antenna, for example, digital TV, digital video recorders as well as computers equipped with a digital tuner, demodulator card, and so on.

Figure 2:
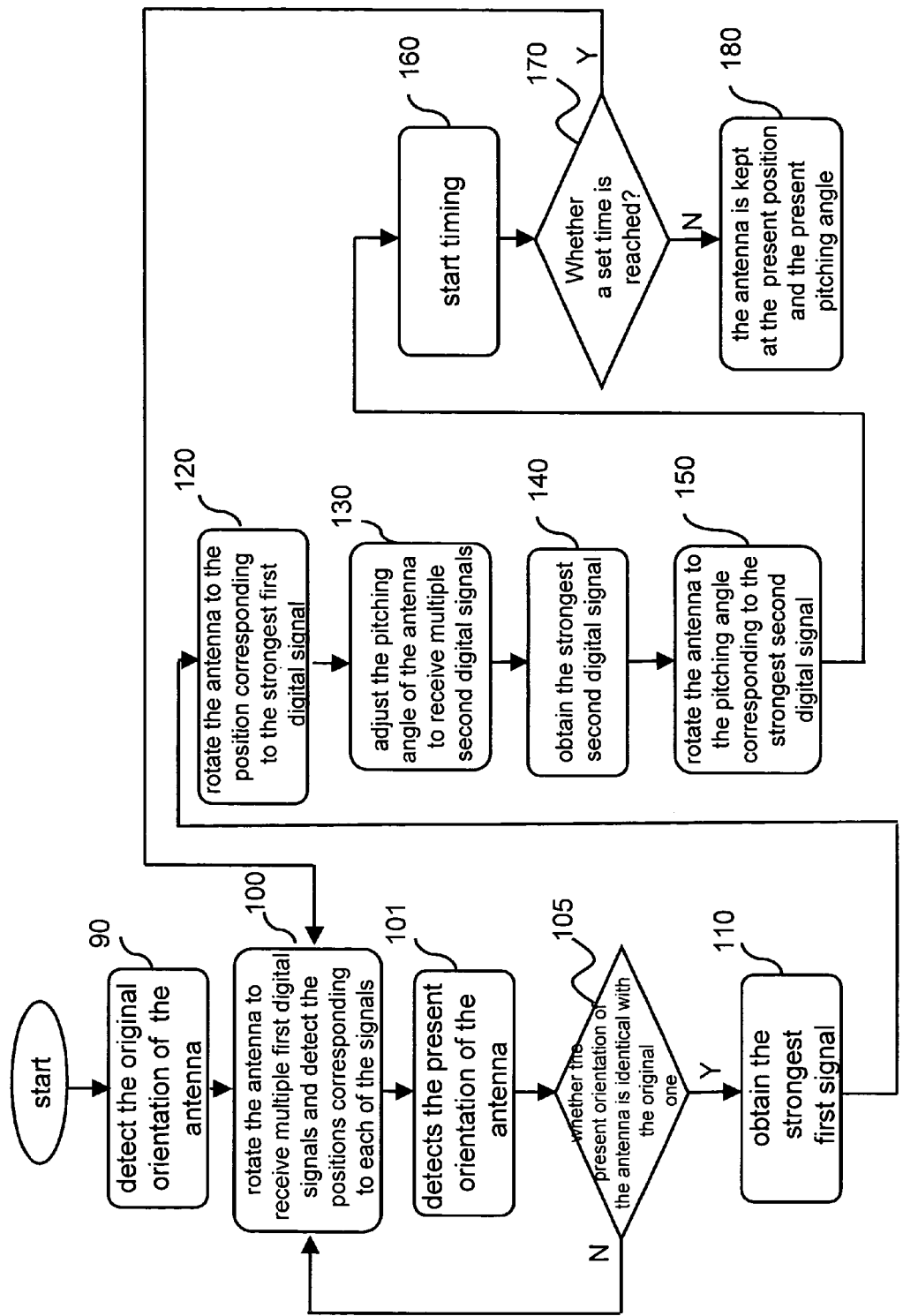
FIG. 2 is a flow chart of the method for automatically adjusting an antenna according to the invention.
Figure 3:
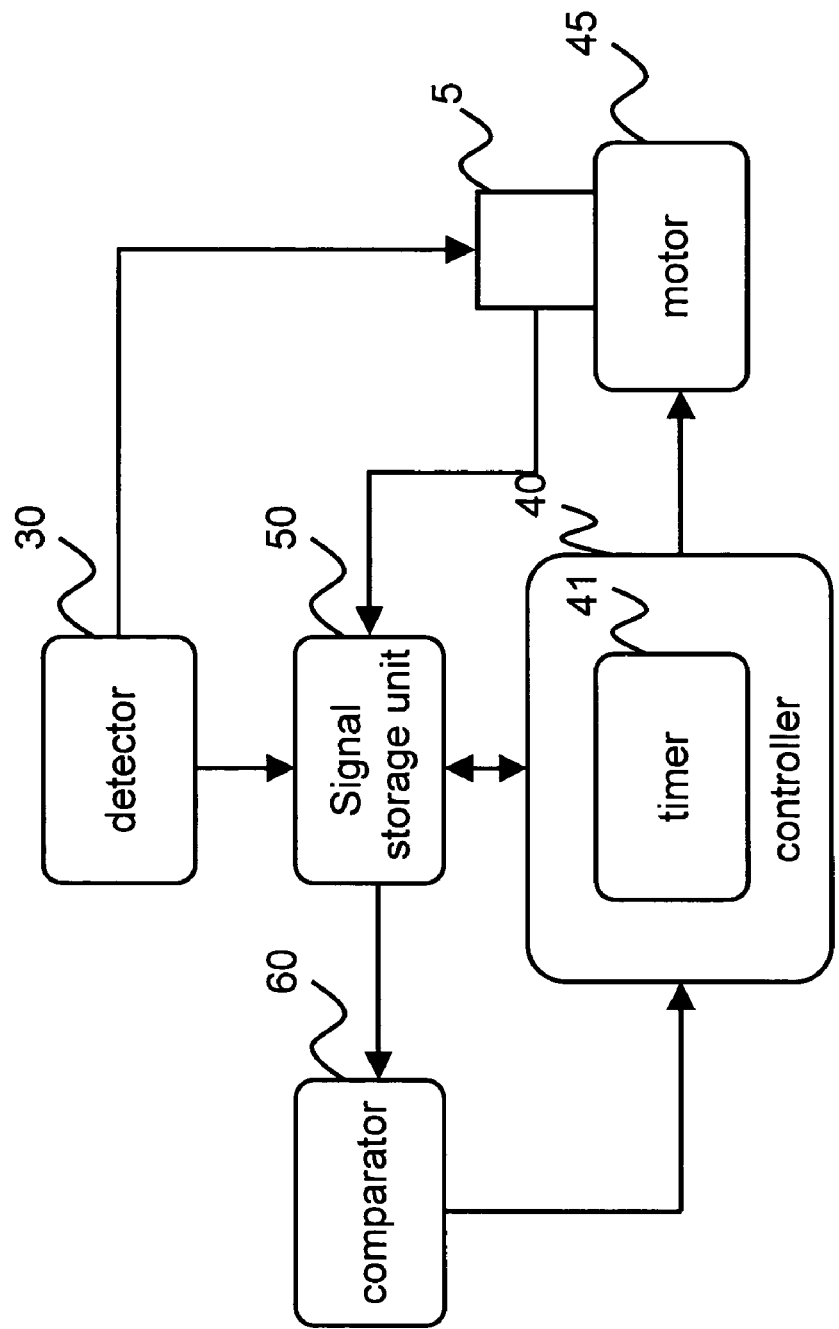
FIG. 3 is an architectural view of the system for automatically adjusting an antenna according to the invention.

Referring to FIGS. 2 and 3, they are a flow chart and a system architectural view of the invention respectively. The system architectural view employs a motor 45. The motor 45 supports and rotates an antenna 5. The system comprises a detector 30, a controller 40, a signal storage unit 50, and a comparator 60. First, the detector 30 detects the original orientation of the antenna 5 (Step 90). Then, the controller 40 starts to drive the motor 45 to rotate the antenna 5, such that the antenna 5 receives multiple first digital signals. Meanwhile, the detector 30 starts to detect the positions corresponding to each of the first digital signals received by antenna 5 when the antenna 5 is rotated. Then, the signal storage unit 50 stores the first digital signals received by the antenna 5 and the positions of each of the first digital signals detected by the detector 30 (Step 100).

The rotating angle of the motor 45 mentioned above can be divided into multiple rotating positions. Therefore, in Step 100, the motor rotates a rotating position and brings the antenna 5 to rotate the position of a unit.

Because of the rotation of the antenna 5, the detector 30 detects the present orientation of the antenna 5 after the antenna 5 being rotated (Step 101), and transmits the original detecting orientation and the present orientation to the comparator 60. Then, the comparator 60 starts to determine whether the present orientation of the antenna 5 is identical with the original orientation according to the original orientation of the antenna 5 (Step 105). If the present orientation of the antenna 5 is identical with the original orientation after the antenna 5 being rotated, the comparator 60 continues to compare the multiple first digital signals to obtain the strongest first signal among them (Step 110). Then, the strongest first digital signal is sent to the controller 40, so that the controller 40 drives the motor 45 to rotate the antenna 5 to the position corresponding to the strongest first digital signal in accordance with the data stored in the signal storage unit 50 (Step 120).

In Step 105, if the detector 30 confirms that the present orientation of the antenna 5 after the antenna 5 being rotated is not its original orientation; the controller 40 continues to drive the motor 45 to rotate the antenna 5. Then, the first digital signals and their corresponding positions are detected and stored by the detector 30 and the signal storage unit 50 (Step 100).

When the controller 40 rotates the antenna 5 to the position corresponding to the strongest first digital signal by driving the motor 45, it drives the motor 45 again to adjust the pitching angle of the antenna 5, such that the antenna 5 receives multiple second digital signals. Then, the detector 30 and the signal storage unit 50 detects and stores the pitching angles corresponding to the multiple second digital signals again (Step 130). The comparator 60 then compares the multiple second digital signals to obtain the strongest second digital signal among them (Step 140), and send the strongest second digital signal back the controller 40.

Finally, the controller 40 drives the motor 45 again to rotate the antenna 5 to the pitching angle corresponding to the strongest second digital signal in accordance with the angles stored in the signal storage unit (Step 150), thereby the whole antenna adjusting process is completed.

The aforementioned action of adjusting the pitching angle of the antenna 5 is the up and down action when the motor 45 operates, so as to change the angle of the antenna 5.

Furthermore, in general, the receiving device is not kept in a static state. Therefore, the controller 40 contains a timer 41 to drive the motor 45 again after a predetermined time interval to adjust the position and pitching angle of the antenna 5, such that the receiving quality of the signals is maintained and the problem of signal weakening caused by the receiving environment is reduced.

In other words, after Step 150, a process can be further included, that is starting timing at a predetermined time (Step 160) and returning to the auto-adjusting process after confirming whether a set time is reached (Step 170), so that the antenna 5 can be positioned in the preferable receiving orientation regardless of its location. If the set time is not reached (Step 170), the antenna 5 is kept at the present position and the present pitching angle (Step 180) till the set time is reached. And then, the above step of adjusting is repeated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for automatically adjusting an antenna, the method employed a motor for driving an antenna, comprising:
    driving the motor to rotate the antenna so as to receive a plurality of first digital signals and record the positions corresponding to the plurality of first digital signals;
    comparing the plurality of first digital signals to obtain the strongest first digital signal among them;
    driving the motor to rotate the antenna to the position corresponding to the strongest first digital signal;
    driving the motor to adjust a pitching angle of the antenna to receive a plurality of second digital signals and record the pitching angles corresponding to the plurality of second digital signals;
    comparing the plurality of second digital signals to obtain the strongest second digital signal among them; and
    driving the motor to rotate the antenna to the pitching angle corresponding to the strongest second digital signal.

2. The method for automatically adjusting an antenna according to claim 1, further comprising:
    starting timing at a predetermined time; and
    confirming whether a set time is reached.

3. The method for automatically adjusting an antenna according to claim 1, further including a step of recording an original orientation of the antenna before the step of driving the motor to rotate the antenna so as to receive a plurality of first digital signals and record the positions corresponding to the plurality of first digital signals.

4. The method for automatically adjusting an antenna according to claim 1, further including a step of recording a present orientation of the antenna after the antenna being rotated according to an original orientation of the antenna after the step of driving the motor to rotate the antenna so as to receive a plurality of first digital signals and record the positions corresponding to the plurality of first digital signals.

5. The method for automatically adjusting an antenna according to claim 1, further including a step of returning to drive the motor to rotate the antenna so as to receive the plurality of first digital signals and record the positions corresponding to the plurality of first digital signals when the present orientation of the antenna is not the original orientation after the antenna being rotated before the step of comparing the plurality of first digital signals to obtain the strongest first digital signal among them.

6. A system for automatically adjusting an antenna, the system employed a motor for rotating an antenna, comprising:
    a controller, for driving the motor to make the antenna receive a plurality of first digital signals when the antenna is rotated, and receive a plurality of second digital signals when a pitching angle of the antenna is adjusted;
    a detector, for detecting the positions corresponding to the plurality of first digital signals when the antenna is rotated, and detecting the pitching angles of the plurality of second digital signals when the pitching angles of the antenna is adjusted;
    a signal storage unit, for storing the plurality of first and second digital signals, the positions corresponding to the plurality of first digital signals and the pitching angles corresponding to the plurality of second digital signals; and
    a comparator, for comparing the plurality of first and second digital signals to obtain the strongest first digital signal and the strongest second digital signal among the plurality of first and second digital signals, and sending the strongest first digital signal and the strongest second digital signal to the controller;
    wherein the controller is used to rotate the motor to rotate the antenna to the position corresponding to the strongest first digital signal and the pitching angle corresponding to the strongest second digital signal.

7. The system for automatically adjusting an antenna according to claim 6, wherein the detector is used to detect an original orientation of the antenna.

8. The system for automatically adjusting an antenna according to claim 7, wherein the detector is used to detect a present orientation of the antenna after the antenna being rotated according to the original orientation of the antenna, and send the original orientation and the present orientation to the comparator.

9. The system for automatically adjusting an antenna according to claim 8, wherein the comparator compares the original orientation with the present orientation, and when the original orientation is identical with the present orientation, the comparator compares the plurality of first digital signals and the plurality of second digital signals.

10. The system for automatically adjusting an antenna according to claim 6, wherein the controller further comprises a timer to start timing at a predetermined time, and when a set time is reached, the controller drives the motor again to rotate the antenna and make the antenna have a different pitching angle.

* * * * *